US011219213B2

(12) United States Patent
Zhong et al.

(10) Patent No.: US 11,219,213 B2
(45) Date of Patent: Jan. 11, 2022

(54) FUNGICIDAL COMPOSITION

(71) Applicant: ADAMA HUIFENG (JIANGSU) LTD., Jiangsu (CN)

(72) Inventors: Hangen Zhong, Yancheng (CN); Hongjin Ji, Yancheng (CN)

(73) Assignee: ADAMA HUIFENG (JIANGSU), LTD., Jiangsu (CN)

( * ) Notice: Subject to any disclaimer, the term of this patent is extended or adjusted under 35 U.S.C. 154(b) by 0 days.

(21) Appl. No.: 16/307,423

(22) PCT Filed: Aug. 8, 2016

(86) PCT No.: PCT/CN2016/094040
§ 371 (c)(1),
(2) Date: Dec. 5, 2018

(87) PCT Pub. No.: WO2018/000528
PCT Pub. Date: Jan. 4, 2018

(65) Prior Publication Data
US 2019/0254279 A1  Aug. 22, 2019

(30) Foreign Application Priority Data

Jun. 26, 2016  (CN) .......................... 201610473426.8

(51) Int. Cl.
| A01N 43/80 | (2006.01) |
| A01N 43/653 | (2006.01) |
| A01N 25/02 | (2006.01) |
| A01N 25/08 | (2006.01) |
| A01N 25/14 | (2006.01) |
| A01N 25/30 | (2006.01) |

(52) U.S. Cl.
CPC ........... *A01N 43/80* (2013.01); *A01N 43/653* (2013.01); *A01N 25/02* (2013.01); *A01N 25/08* (2013.01); *A01N 25/14* (2013.01); *A01N 25/30* (2013.01)

(58) Field of Classification Search
None
See application file for complete search history.

(56) References Cited

U.S. PATENT DOCUMENTS

| 9,282,744 | B2 * | 3/2016 | Zhong | .................... A01N 43/84 |
| 10,561,143 | B2 * | 2/2020 | Zhong | .................... A01N 43/56 |
| 2015/0051231 | A1 * | 2/2015 | Borges | ................. A01N 43/653 |
| | | | | 514/269 |
| 2019/0150446 | A1 * | 5/2019 | Zheng | .................... A01N 43/80 |

FOREIGN PATENT DOCUMENTS

| CN | 102100233 A | 6/2011 | | |
| CN | 102258037 A | 11/2011 | | |
| CN | 106259366 A | 1/2017 | | |
| GB | 2264641 A | * | 9/1993 | ............. A01N 55/00 |
| JP | 2003213285 A | 7/2003 | | |
| WO | 2014026396 A1 | 2/2014 | | |
| WO | WO-2014026396 A1 | * | 2/2014 | ............. A01N 47/38 |

OTHER PUBLICATIONS

Kristiina Aalto-Korte, Preservatives in vinyl gloves can cause allergy, Dec. 18, 2007, Swedish Medicine Agency, https://www.fimea.fi/web/sv/-/konserveringsmedel-i-vinylhandskar-kan-framkalla-aller-1 (Year: 2007).*
1,2-benzisothiazol-3(2H)-one, CAS registry No. 2634-33-5, Jun. 18, 2020, SciFinder A CAS Solution, https://scifinder.cas.org/scifinder/view/scifinder/scifinderExplore.jsf (Year: 2020).*
Mar. 30, 2017 International Search Report issued in International Patent Application PCT/CN2016/094040.
Yang, Fengli et al., "Brief Report on Flutriafol's Field Efficacy on Powdery Mildew of Strawberry", China Plant Protection, vol. 36, No. 3, Apr. 18, 2016, pp. 72-73.
Fei, Xiuhua et al., "25% Flutriafol SC's Field Efficacy on Preventing and Treating Wheat Rust", Mordern Agrochemicals, vol. 6, No. 1, Apr. 5, 2007, p. 31.

* cited by examiner

*Primary Examiner* — Abigail Vanhorn
*Assistant Examiner* — Ali S Saeed
(74) *Attorney, Agent, or Firm* — Oliff PLC

(57) ABSTRACT

A fungicidal composition comprising active components A and B, wherein the active component A is benzisothiazolinone, and the active component B is flutriafol; and the weight ratio of the two components is 1:30-30:1. Also provided are a preparation method and use of the composition. Test results show that the fungicidal composition provided in the present invention has an obvious synergistic effect, and more importantly, the application rate is reduced and the cost is reduced. The fungicidal composition is effective in controlling certain specific fungal diseases of the crops. Through the combination of different fungicides with different mechanisms and modes of action, the application rate of each single agent is effectively reduced, and a good effect on broadening the fungicidal spectrum, retarding the fungal resistance and improving the control effect is exhibited.

10 Claims, No Drawings

FUNGICIDAL COMPOSITION

BACKGROUND

Technical Field

The present invention relates to the field of protection of agricultural plants, in particular to a fungicidal composition with improved properties, and particularly to a fungicidal composition comprising a benzisothiazolinone and flutriafol.

Related Art

Benzisothiazolinone compounds are a new broad-spectrum fungicide, which is mainly used for controlling and treating various bacterial and fungal diseases on cereal crops, vegetables, and fruits. The mechanisms of fungicidal action mainly include destroying the nuclei structure of the harmful fungi to cause them to die due to lose of the core component, and interfering with the metabolism of the fungal cells to cause physiological disturbance, thus ultimately leading to death. When the agent is used in the early stage of disease development, the plants may be effectively protected against infection of pathogens; and when the agent is used in an appropriately increased amount after the disease is developed, the spread of the harmful fungi is considerably controlled, thus achieving dual actions of protection and eradication.

Flutriafol is a broad-spectrum systemic fungicide useful in the protection against and treatment of various diseases caused by basidiomycetes and ascomycetes and effective in the control of powdery mildew, rust, and smut of wheat crops, maize smut and so on. The mechanism of action is mainly to inhibit the biosynthesis of ergosterol, thus causing the wall rupture of fungal cells and to inhibit the mycelial growth. Flutriafol is also a fungicide having eradication, protection, contact poisoning and systemic activities. Flutriafol is useful in the protection against and treatment of various diseases caused by basidiomycetes and ascomycetes and has a fumigation action, but is inactive for oomycetes and bacteria. The agent has good systemic action, and can be absorbed through the roots, stems and leaves of plants, and then transferred upward by vascular bundles. The systemic action in the root is greater than that in the stems and leaves. However, the lateral transfer or transfer from the phloem to the foot is impossible. Therefore, flutriafol can inhibit the growth of fungi in or outside the plants. Flutriafol is able to eradicate the spores of powdery mildew threatening the wheat crops. 5-10 days after application, the previously formed spots disappear.

Practical experience in pesticides has shown that repeated and specific application of an active compound to control harmful fungi leads in many cases to the rapid selectivity of fungal strains. To reduce the risk of selectivity of resistant fungal strains, a mixture of compounds with different activities is generally used at present to control harmful fungi. By combining active compounds with different mechanisms of action, it is possible to delay the development of resistance, reduce the application rate and reduce the cost.

SUMMARY

In view of the problems of resistance development and residue in the soil encountered by fungicides in practical application, an object of the present invention is to screen out fungicides with different mechanisms of bactericidal action, which are combined to obtain a new fungicidal composition, so as to enhance the control effect of the bactericides, delaying the resistance development, reduce the amount of application, and reduce the cost.

Another object of the present invention is to provide a method for preparing a fungicidal composition comprising active components A and B and use thereof in controlling the pests on crops in the agricultural area.

The objects of the present invention can be achieved through the following measures.

A fungicidal composition having synergistic effect comprises active components A and B, wherein the active component A is benzisothiazolinone, and the active component B is flutriafol.

The inventor has found through experiments that the composition of the present invention has an obvious synergistic effect on controlling bacterial or fungal diseases of crops and more importantly, the application rate is reduced and the cost is lowered. The compounds constituting the components A and B have different structures and different mechanisms of action, and the combination of the two compounds can broaden the fungicidal spectrum and retard the occurrence and development of fungal resistance to a certain extent. Moreover, no cross resistance exists between the components A and B.

The weight ratio between the two components in the fungicidal composition of the present invention is 1:30-30:1. In a preferred embodiment, the weight ratio between the active component A and the active component B is 1:20-20:1, and the weight ratio is further preferably 1:10-10:1, to achieve a better effect.

In some specific embodiment, the active components A and B may be at any specific ratios of 30:1, 29:1, 28:1, 27:1, 26:1, 25:1, 24:1, 23:1, 22:1, 21:1, 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:21, 1:22, 1:23, 1:24, 1:25, 1:26, 1:27, 1:28, 1:29, and 1:30, or the ratio may be selected from a range delimited by any two ratios above.

The composition of the present invention may be prepared into a pesticidally acceptable formulation with the active ingredients and a pesticide aid or adjuvant. Further, the composition is in the form of a pesticidally acceptable formulation comprising 4-80 wt % of the active components and 96-20 wt % of a pesticide adjuvant.

The present invention provides use of the bactericidal composition comprising components A and B in the control of crop diseases in the agricultural area, in particular in the control of fungal or bacterial diseases of certain crops.

The composition may specifically comprise a pesticide adjuvant, such as one or more of a carrier, a solvent, a dispersant, a wetting agent, a binder, a thickener, an adhesive, a surfactant, a fertilizer and the like. A commonly used adjuvant may be blended during application.

The suitable adjuvant or aid may be a solid or liquid that is generally a material commonly used in the preparation of formulations, for example, a natural or regenerated mineral substance, a solvent, a dispersing agent, a wetting agent, an adhesive, a thickener, or a binder.

The composition of the present invention may be applied by administering the composition of the present invention to the aboveground parts of plants, in particular to the leaves or leaf surface thereof. The composition may be used for seed impregnation, or applied onto the surface of the objects to be controlled. The application frequency and dosage depend on the pathogen biology and the climatic and maintenance conditions. The locus where the plant is growing, for example rice field, may be impregnated with a liquid formulation of the composition, or the composition is applied in solid form to the soil, for example, in granular form (soil application), where the composition penetrates the plant through the roots via the soil (systemic action).

The composition of the present invention can be prepared into various pesticidally acceptable formulations, including, but not limited to, emulsifiable concentrates, suspensions, wettable powders, water dispersible granules, powders, granules, aqueous solutions, aqueous emulsions, microemulsions, bait, mother liquor, mother powder, and so on. In a preferred embodiment, the formulation in the present invention is an aqueous solution, a suspension, a dispersible powder, water dispersible granules, or a microemulsion. Depending on the properties of the compositions, the objectives intended to be achieved by applying the compositions, and the environmental conditions, the compositions may be applied by spraying, atomizing, dusting, scattering, or pouring.

The composition of the present invention may be prepared into various formulations through known processes. The active ingredients may be uniformly mixed with an adjuvant such as a solvent or a solid carrier and a surfactant if needed, and ground to prepare a desired formulation.

The solvent may be selected from aromatic hydrocarbons containing preferably 8 to 12 carbon atoms, for example, a xylene mixture, substituted benzene, or a phthalate ester, for example, dibutyl or dioctyl phthalate; aliphatic hydrocarbons, for example, cyclohexane or paraffin; alcohols, glycols and ethers and esters thereof, for example, ethanol, ethylene glycol, and ethylene glycol monomethyl ether; ketones, for example, cyclohexanone; high-polarity solvents, for example, N-methyl-2-pyrrolidone, dimethyl sulfoxide, or dimethyl formamide; and vegetable oils, for example, soy bean oil.

The solid carrier includes for example natural mineral fillers generally used in powders and dispersible agents, for example, talc, kaolin, montmorillonite or activated bauxite. To manage the physical properties of the composition, highly dispersive silicic acid or highly dispersive absorbent polymer carrier may also be added, for example, granular adsorptive carrier or non-adsorptive carrier. The suitable granular adsorptive carrier is porous, for example, pumice, soapy clay or bentonite. The suitable non-adsorptive carrier includes for example calcite or sand. Moreover, a large amount of inorganic or organic material that is pre-prepared into granules and especially dolomite may be used as the carrier.

As desired by the chemical nature of the active ingredients in the composition according to the present invention, the suitable surfactant includes lignin sulfonic acid, naphthalenesulfonic acid, phenolsulfonic acid, alkaline earth metal or amine salts, alkylarylsulfonates, alkylsulfates, alkylsulfonates, fatty alcohol sulfates, fatty acids and ethylene glycol sulfated fatty alcohol ethers, condensation products of sulfonated naphthalene and naphthalene derivatives with formaldehyde, condensation products of naphthalene or naphthalenesulfonic acid with phenol and formaldehyde, polyoxyethylene octyl phenyl ethers, ethoxylated iso-octylphenol, octylphenol, nonylphenol, alkylaryl polyethylene glycol ethers, tributylphenyl polyethylene glycol ether, tristearylphenyl polyethylene glycol ether, alkylaryl polyether alcohols, ethoxylated castor oil, polyoxyethylene alkyl ethers, condensation products of ethylene oxide, ethoxylated polyoxypropylene, polyethylene glycol ether laurate acetal, sorbates, waste lignin sulfite liquor, and methyl cellulose.

When a liquid formulation is prepared, the active ingredient A may be first dissolved in a basic material to form a metal salt of benzisothiazoline. Suitable basic materials include alkali metal carbonates, alkali metal hydroxides (e.g. sodium and potassium hydroxide), alkali metal alkoxycarbonates, alkali metal alkoxides or magnesium methoxide.

The two active ingredients in the composition of the present invention have a synergistic effect, such that the activity of the composition is obviously higher than the respective activity or expected sum of the respective activity of single compounds alone. The synergistic effect is manifested as reduced application rate, broadened fungicidal spectrum, fast onset of action, long-lasting control effect, better control of harmful fungi on plants by only one or a few applications, and broadened possible application interval. These features are particularly needed in the fungal control practice of plants.

The fungicidal composition of the present invention is applicable to the control of crop diseases in the agricultural area, and the specific diseases to be treated include, but are not limited to, peach bacterial shot hole, tobacco wildfire, rice sheath blight, cucumber angular leaf spot, cucumber downy mildew, rice bacterial leaf streak, rice bacterial foot rot, bacterial wilt of corn, *Fusarium* wilt of watermelon, downy mildew of grape, tomato bacterial wilt, eggplant bacterial wilt, rice false smut, rice bacterial leaf streak, pepper anthracnose, litchi ulcerates, grape anthracnose, tobacco bacterial wilt, cucumber anthracnose, celery leaf blotch, lotus root blight, strawberry powdery mildew, lettuce downy mildew, celery gray mold, apricot bacterial shot hole, peach ulcerates, onion downy mildew, cotton bacterial angular leaf spot, cucumber bacterial leaf blight and the like.

The composition of the present invention exhibits the following additional features. 1. The composition of the present invention has an obvious synergistic effect. 2. Because the two individual agents in the composition of the present invention have highly different structures and completely different mechanisms of action, no cross resistance exists, such that the problem of resistance development occurred due to the use of single agents alone can be retarded. 3. The composition of the present invention is safe for the crops and has good efficacy. The test proves that the fungicidal composition of the present invention has stable chemical properties, significant synergistic effects and obvious synergistic and complementary effects on the objects controlled.

DETAILED DESCRIPTION

To make the objects, the technical solution, and advantages of the present invention clearer, the present invention is described in further detail with reference to examples. It should be understood that the specific examples described herein are merely provided for illustrating, instead of limiting the present invention. Any modifications and equivalent improvements and substitutions can be made thereto without departing from the spirit and principle of the present invention, which are all fall within the protection scope of the present invention.

The percentages given in all the formulations in the examples below are all weight percentages. The various formulations are processed from the composition of the present invention by a process known in the prior art which may be varied as desired.

I. Preparation Examples of Formulations (I) Processing and Examples of Wettable Powder The active ingredients A and B and various additives and fillers were fully mixed in proportion, and ground by an ultrafine grinder to prepare a wettable powder.

Example 1: 52% Benzisothiazolinone·Flutriafol Wettable Powder benzisothiazolinone 2%, flutriafol 50%, Nekal 5%, bentonite 3%, alkyl polyoxyethylene ether sulfonate 4%, white carbon black 5%, and diatomite q.s. to 100%.

Example 2: 44% Benzisothiazolinone·Flutriafol Wettable Powder benzisothiazolinone 4%, flutriafol 40%, sodium ligninsulfonate 5%, alkyl polyoxyethylene ether sulfonate 6%, white carbon black 10%, and diatomite q.s. to 100%.

Example 3: 12% Benzisothiazolinone·Flutriafol Wettable Powder benzisothiazolinone 10%, flutriafol 2%, sodium ligninsulfonate 5%, alkyl sulfonate 5%, white carbon black 10%, and Kaolin q.s. to 100%.

Example 4: 64% Benzisothiazolinone·Flutriafol Wettable Powder benzisothiazolinone 60%, flutriafol 4%, soapy clay 3%, alkyl sulfonate 5%, white carbon black 5%, and diatomite q.s. to 100%.

Example 5: 31% Benzisothiazolinone·Flutriafol Wettable Powder benzisothiazolinone 30%, flutriafol 1%, sodium benzoate 5%, alkyl polyoxyethylene ether sulfonate 6%, white carbon black 10%, and Kaolin q.s. to 100%.

(II) Processing and Examples of Suspensions

The active ingredients A and B were uniformly mixed with a dispersing agent, a wetting agent, a thickener, water and other components in proportion, and ground and/or high-speed sheared to give a semi-finished product, which was analyzed, supplemented with water, mixed uniformly, and filtered, to obtain a finished product.

Example 6: 15.5% Benzisothiazolinone·Flutriafol Suspension benzisothiazolinone 0.5%, flutriafol 15%, white carbon black 5%, ethylene glycol 5%, fatty alcohol polyoxyethylene ether phosphate 6%, and water q.s. to 100%.

Example 7: 32% Benzisothiazolinone·Flutriafol Suspension benzisothiazolinone 2%, flutriafol 30%, white carbon black 3%, glycerol 4%, sodium benzoate 2%, sodium methyl naphthalene sulfonate-formaldehyde condensate 5%, and water q.s. to 100%.

Example 8: 10% Benzisothiazolinone·Flutriafol Suspension benzisothiazolinone 5%, flutriafol 5%, bentonite 4%, ethylene glycol 5%, sodium benzoate 7%, Xantham gum 2%, and water q.s. to 100%.

Example 9: 21% Benzisothiazolinone·Flutriafol Suspension benzisothiazolinone 20%, flutriafol 1%, bentonite 3%, glycerol 5%, sodium ligninsulfonate 4%, sodium methyl naphthalene sulfonate-formaldehyde condensate 5%, and water q.s. to 100%.

(III) Processing and Examples of Water Dispersible Granules

The active components A and B, an adjuvant and a filler were mixed evenly according to the ratio of the formulation, comminuted by gas stream into a wettable powder, then added with an amount of water, mixed, extruded, granulated, dried, and sieved, to obtain a water dispersible granule product.

Example 10: 10.5% Benzisothiazolinone·Flutriafol Water Dispersible Granules benzisothiazolinone 0.5%, flutriafol 10%, potassium dodecyl sulfonate 5%, ammonium sulfate 5%, potassium alkyl naphthalene sulfonate 4%, and light calcium carbonate q.s. to 100%.

Example 11: 30% Benzisothiazolinone·Flutriafol Water Dispersible Granules benzisothiazolinone 5%, flutriafol 25%, sodium methyl naphthalene sulfonate-formaldehyde condensate 5%, sodium dodecyl sulfate 3%, sodium ligninsulfonate 6%, and diatomite q.s. to 100%.

Example 12: 22% Benzisothiazolinone·Flutriafol Water Dispersible Granules benzisothiazolinone 20%, flutriafol 2%, potassium dodecyl sulfonate 3%, ammonium sulfate 5%, sodium methyl naphthalene sulfonate-formaldehyde condensate 5%, and light calcium carbonate q.s. to 100%.

Example 13: 52% Benzisothiazolinone·Flutriafol Water Dispersible Granules benzisothiazolinone 50%, flutriafol 2%, sodium methyl naphthalene sulfonate-formaldehyde condensate 5%, sodium dodecyl sulfate 5%, ammonium sulfate 5%, and diatomite q.s. to 100%.

II. Efficiency Verification Test

(I) Bioassay Examples

Based on the test grade scale, the disease development on the leaves of the whole cucumber plant was investigated, and the disease index and control effect were calculated.

The control effect was converted into probability (y), the concentration of the agents (μg/ml) in solution was converted into a logarithmic value (x), the toxic regression equation and the median inhibition concentration EC50 were calculated by least square method, and the toxicity index and the co-toxicity coefficient (CTC) of the agents were calculated by SUN Peiyun method.

Actual toxicity index (ATI)=(EC50 of standard/EC50 of test agent)*100

Theoretical toxicity index (TTI)=toxicity index of agent $A$*percentage content of $A$ in the mixture+toxicity index of agent $B$*percentage content of $B$ in the mixture Co-toxicity coefficient (CTC)=[actual toxicity index (ATI) of the mixture/theoretical toxicity index (TTI) of the mixture]*100

≥Where CTC≤80, the composition exhibits an antagonistic effect; where 80<CTC<120, the composition exhibits an additive effect, and where CTC≥120, the composition exhibits a synergistic effect.

1. Toxicity Test of Benzisothiazolinone Combined with Flutriafol application was given after 7 days. Each treatment included 4 plots of 20 square meters each. The disease development before application and 11 days after the second application was statistically investigated. Samples were collected from 5 locations in each plot at random, and 5 plants were investigated at each location by investigating the percentages of the disease spot area on the leaves relative to the leaf area of the whole plant and grading. The disease index and the control effect were calculated.

Disease index =

$$\frac{\Sigma\left(\begin{array}{c}\text{Number of leaves at each}\\ \text{grade of disease development}\end{array} \times \begin{array}{c}\text{Representative value}\\ \text{of corresponding grade}\end{array}\right)}{\begin{array}{c}\text{Total number of}\\ \text{leaves investigated}\end{array} \times \begin{array}{c}\text{Representative value}\\ \text{of highest level}\end{array}} \times 100$$

Control effect (%) =

$$\left(1 - \frac{\begin{array}{c}\text{Disease index of control}\\ \text{group before application}\end{array} \times \begin{array}{c}\text{Disease index of treatment}\\ \text{group after application}\end{array}}{\begin{array}{c}\text{Disease index of control}\\ \text{group after application}\end{array} \times \begin{array}{c}\text{Disease index of treatment}\\ \text{group before application}\end{array}}\right) \times 100$$

Anticipated control effect (%)=X+Y−XY/100 (where X and Y are the control effect of a sigle agent)

Grade Scale:

Grade 0: no disease spot;

Grade 1: number of disease spots on the leaf<5, and length<1 cm;

TABLE 1

Toxicity test result analysis of benzisothiazolinone combined with flutriafol on wheat leaf rust

| Name of agent | EC$_{50}$ (μg/ml) | ATI | TTI | Co-toxicity coefficient (CTC) |
|---|---|---|---|---|
| Flutriafol | 67.34 | 100.00 | \ | \ |
| Benzisothiazolinone | 40.23 | 167.39 | \ | \ |
| Benzisothiazolinone:flutriafol = 1:30 | 53.25 | 126.45 | 102.17 | 123.76 |
| Benzisothiazolinone:flutriafol = 1:25 AM | 52.15 | 129.13 | 102.59 | 125.87 |
| Benzisothiazolinone:flutriafol = 1:20 AM | 48.61 | 138.54 | 103.21 | 134.23 |
| Benzisothiazolinone:flutriafol = 1:15 AM | 46.94 | 143.47 | 104.21 | 137.67 |
| Benzisothiazolinone:flutriafol = 1:10 AM | 42.85 | 157.16 | 106.13 | 148.09 |
| Benzisothiazolinone:flutriafol = 1:5 | 40.30 | 167.10 | 111.23 | 150.23 |
| Benzisothiazolinone:flutriafol = 1:1 | 33.02 | 203.94 | 133.69 | 152.54 |
| Benzisothiazolinone:flutriafol = 5:1 | 28.56 | 235.76 | 156.16 | 150.98 |
| Benzisothiazolinone:flutriafol = 10:1 | 28.11 | 239.57 | 161.26 | 148.56 |
| Benzisothiazolinone:flutriafol = 15:1 | 29.91 | 225.15 | 163.18 | 137.98 |
| Benzisothiazolinone:flutriafol = 20:1 | 30.33 | 222.02 | 164.18 | 135.23 |
| Benzisothiazolinone:flutriafol = 25:1 | 32.19 | 209.21 | 164.80 | 126.95 |
| Benzisothiazolinone:flutriafol = 30:1 | 32.85 | 204.98 | 165.21 | 124.07 |

The results (in Table 1) show that the control effect of the combination of benzisothiazolinone and flutriafol on wheat leaf rust is significantly improved, suggesting that the combination of the two components has an obvious synergistic effect on wheat leaf rust. Experiments show that when the ratio of benzisothiazolinone to flutriafol is beyond the range defined in the present invention, the co-toxicity coefficient is below 120.

II. Field Efficiency Verification Test

Test method: in early stage of disease development, the first spray was given immediately, and then the second Grade 3: 6≤number of disease spots on the leaf≤10, and length of some disease spots>1 cm;

Grade 5: 11≤number of disease spots on the leaf≤25, some disease spots are contiguous, and the disease spot area is 10-25% of the leaf area;

Grade 7: number of disease spots on the leaf≥26, the disease spots are contiguous, and the disease spot area is 26-50% of the leaf area;

Grade 9: the disease spots are contiguous, and the disease spot area is above 50% of the leaf area, or all the leaves all wilted.

1. Field Efficacy Test of Benzisothiazolinone Combined with Flutriafol

TABLE 2

Control effect of benzisothiazolinone combined with flutriafol on strawberry powdery mildew

| No. | Agent | Amount (mg/kg) | Disease index before application | Day 11 after the second application Disease index | Control effect (%) |
|---|---|---|---|---|---|
| Example 1 | 3% benzisothiazolinone wettable powder | 4.6 | 15.36 | 30.55 | 6.07 |
| | 50% flutriafol wettable powder | 115.4 | 14.98 | 11.23 | 64.58 |
| | Anticipated control efficacy after mixing them | — | — | — | 66.73 |
| | 52% benzisothiazolinone•flutriafol wettable powder (benzisothiazolinone:flutriafol = 1:25) | 120 | 16.02 | 9.82 | 71.05 |
| Example 2 | 3% benzisothiazolinone wettable powder | 10.9 | 14.78 | 28.26 | 9.69 |
| | 80% flutriafol wettable powder | 109.1 | 14.56 | 11.99 | 61.11 |
| | Anticipated control efficacy after mixing them | — | — | — | 64.88 |
| | 44% benzisothiazolinone•flutriafol wettable powder (benzisothiazolinone:flutriafol = 1:10 AM) | 120 | 16.21 | 7.51 | 78.11 |
| Example 3 | 3% benzisothiazolinone wettable powder | 100.0 | 13.98 | 11.96 | 59.61 |
| | 50% flutriafol wettable powder | 20.0 | 14.03 | 26.10 | 12.13 |
| | Anticipated control efficacy after mixing them | — | — | — | 64.51 |
| | 12% benzisothiazolinone•flutriafol wettable powder (benzisothiazolinone:flutriafol = 5:1) | 120 | 17.32 | 7.97 | 78.28 |
| Example 4 | 3% benzisothiazolinone wettable powder | 112.5 | 10.78 | 7.58 | 66.81 |
| | 50% flutriafol wettable powder | 7.5 | 16.43 | 32.97 | 5.23 |
| | Anticipated control efficacy after mixing them | — | — | — | 68.55 |
| | 64% benzisothiazolinone•flutriafol wettable powder (benzisothiazolinone:flutriafol = 15:1) | 120 | 11.37 | 5.40 | 77.57 |
| Example 5 | 3% benzisothiazolinone wettable powder | 116.1 | 10.77 | 7.17 | 68.56 |
| | 80% flutriafol wettable powder | 3.9 | 12.34 | 25.28 | 3.25 |
| | Anticipated control efficacy after mixing them | — | — | — | 69.58 |
| | 31% benzisothiazolinone•flutriafol wettable powder (benzisothiazolinone:flutriafol = 30:1) | 120 | 15.04 | 8.58 | 73.07 |
| Example 6 | 3% benzisothiazolinone suspension | 3.9 | 12.22 | 24.38 | 5.78 |
| | 25% flutriafol suspension | 116.1 | 15.34 | 11.29 | 65.24 |
| | Anticipated control efficacy after mixing them | — | — | — | 67.25 |
| | 15.5% benzisothiazolinone•flutriafol suspension (benzisothiazolinone:flutriafol = 1:30) | 120 | 16.03 | 9.90 | 70.82 |
| Example 7 | 3% benzisothiazolinone suspension | 7.5 | 13.98 | 27.29 | 7.81 |
| | 40% flutriafol suspension | 112.5 | 14.34 | 11.24 | 62.99 |
| | Anticipated control efficacy after mixing them | — | — | — | 65.88 |
| | 32% benzisothiazolinone•flutriafol suspension (benzisothiazolinone:flutriafol = 1:15 AM) | 120 | 15.67 | 8.34 | 74.85 |
| Example 8 | 3% benzisothiazolinone suspension | 60.0 | 15.78 | 20.98 | 37.22 |
| | 40% flutriafol suspension | 60.0 | 15.33 | 21.37 | 34.15 |
| | Anticipated control efficacy after mixing them | — | — | — | 58.66 |
| | 10% benzisothiazolinone•flutriafol suspension (benzisothiazolinone:flutriafol = 1:1) | 120 | 10.89 | 6.12 | 73.44 |

TABLE 2-continued

Control effect of benzisothiazolinone combined with flutriafol on strawberry powdery mildew

| No. | Agent | Amount (mg/kg) | Disease index before application | Day 11 after the second application | |
|---|---|---|---|---|---|
| | | | | Disease index | Control effect (%) |
| Example 9 | 3% benzisothiazolinone suspension | 114.3 | 10.34 | 7.10 | 67.59 |
| | 40% flutriafol suspension | 5.7 | 14.98 | 30.37 | 4.25 |
| | Anticipated control efficacy after mixing them | — | — | — | 68.97 |
| | 21% benzisothiazolinone•flutriafol suspension (benzisothiazolinone:flutriafol = 20:1) | 120 | 14.44 | 6.88 | 77.50 |
| Example 10 | 3% benzisothiazolinone water dispersible granules | 5.7 | 15.87 | 31.28 | 6.92 |
| | 35% flutriafol water dispersible granules | 114.3 | 16.39 | 12.51 | 63.95 |
| | Anticipated control efficacy after mixing them | — | — | — | 66.44 |
| | 10.5% benzisothiazolinone•flutriafol water dispersible granules (benzisothiazolinone:flutriafol = 1:20) | 120 | 10.74 | 5.74 | 74.76 |
| Example 11 | 3% benzisothiazolinone water dispersible granules | 20.0 | 13.77 | 24.84 | 14.79 |
| | 20% flutriafol water dispersible granules | 100.0 | 15.98 | 14.85 | 56.12 |
| | Anticipated control efficacy after mixing them | — | — | — | 62.61 |
| | 30% benzisothiazolinone•flutriafol water dispersible granules (benzisothiazolinone:flutriafol = 1:5) | 120 | 16.22 | 8.04 | 76.59 |
| Example 12 | 3% benzisothiazolinone water dispersible granules | 109.1 | 15.09 | 11.27 | 64.72 |
| | 20% flutriafol water dispersible granules | 10.9 | 10.78 | 21.20 | 7.14 |
| | Anticipated control efficacy after mixing them | — | — | — | 67.24 |
| | 22% benzisothiazolinone•flutriafol water dispersible granules (benzisothiazolinone:flutriafol = 10:1) | 120 | 15.23 | 6.33 | 80.36 |
| Example 13 | 3% benzisothiazolinone water dispersible granules | 115.4 | 16.89 | 11.35 | 68.27 |
| | 35% flutriafol water dispersible granules | 4.6 | 15.34 | 31.30 | 3.64 |
| | Anticipated control efficacy after mixing them | — | — | — | 69.42 |
| | 52% benzisothiazolinone•flutriafol water dispersible granules (benzisothiazolinone:flutriafol = 25:1) | 120 | 16.67 | 9.28 | 73.69 |
| CK | Water control | — | 15.42 | 32.65 | — |

The test results (in Table 2) show that the control effect of the combination of benzisothiazolinone and flutriafol on strawberry powdery mildew is significantly improved, suggesting that the combination of the two components has an obvious synergistic effect on strawberry powdery mildew.

What is claimed is:

1. A pesticidally acceptable formulation prepared with fungicidal active components and optionally a pesticide adjuvant or aid, wherein the fungicidal active components consist of active components A and B as the only active components, wherein the active component A is benzisothiazolinone, the active component B is flutriafol, the weight ratio between the two components is 1:30-30:1.

2. The pesticidally acceptable formulation according to claim 1, wherein the weight ratio of the active component A to the active component B is 1:20-20:1.

3. The pesticidally acceptable formulation according to claim 2, wherein the weight ratio of the active component A to the active component B is 1:10-10:1.

4. The pesticidally acceptable formulation according to claim 1, wherein the pesticide adjuvant or aid is present.

5. The pesticidally acceptable formulation according to claim 4, comprising 4-80 wt % of active components and 96-20 wt % of a pesticide adjuvant.

6. The pesticidally acceptable formulation according to claim 4, wherein the formulation is a wettable powder, a suspension, or water dispersible granules.

7. The pesticidally acceptable formulation according to claim 4, wherein the pesticide adjuvant or aid is one or more selected from a carrier, a solvent, a dispersant, a wetting agent, a binder, a thickener, an adhesive, a surfactant, and a fertilizer.

8. A method of controlling crop diseases in an agricultural area, comprising applying the pesticidally acceptable formulation according to claim 1 to the agricultural area.

9. The method according to claim 8, wherein the applying comprises controlling wheat leaf rust or strawberry powdery mildew in the agricultural area.

10. A pesticidally acceptable formulation prepared with fungicidal active components and optionally a pesticide adjuvant or aid, wherein the fungicidal active components consist of active component A and active component B wherein the active component A is benzisothiazolinone, the active component B is flutriafol, the weight ratio between the two components is 1:30-30:1 with the exclusion of 1:25.

* * * * *